(12) United States Patent
Eversoll et al.

(10) Patent No.: US 10,004,997 B2
(45) Date of Patent: Jun. 26, 2018

(54) SMART PHONE CONTROLLABLE CONSTRUCTION BRICK VEHICLE

(71) Applicant: Meeper Technology, LLC, Verona, WI (US)

(72) Inventors: Elizabeth Eversoll, Verona, WI (US); James Brandon, Watertown, WI (US)

(73) Assignee: Meeper Technology, LLC, Verona, WI (US)

(*) Notice: Subject to any disclaimer, the term of this patent is extended or adjusted under 35 U.S.C. 154(b) by 316 days.

(21) Appl. No.: 14/933,348

(22) Filed: Nov. 5, 2015

(65) Prior Publication Data

US 2016/0129358 A1    May 12, 2016

Related U.S. Application Data (60) Provisional application No. 62/076,925, filed on Nov. 7, 2014.

(51) Int. Cl.

| | |
|---|---|
| *A63H 18/16* | (2006.01) |
| *A63H 17/44* | (2006.01) |
| *A63H 17/32* | (2006.01) |
| *A63H 30/04* | (2006.01) |
| *A63H 17/26* | (2006.01) |
| *A63H 17/00* | (2006.01) |
| *A63F 13/25* | (2014.01) |
| *A63F 13/34* | (2014.01) |
| *A63F 13/327* | (2014.01) |
| *A63F 13/577* | (2014.01) |

(52) U.S. Cl.
CPC .............. *A63H 30/04* (2013.01); *A63F 13/25* (2014.09); *A63F 13/327* (2014.09); *A63F 13/34* (2014.09); *A63F 13/577* (2014.09); *A63H 17/002* (2013.01); *A63H 17/26* (2013.01); *A63H 2200/00* (2013.01)

(58) Field of Classification Search
CPC ..... A63H 17/26; A63H 30/04; A63H 2200/00
See application file for complete search history.

(56) References Cited

U.S. PATENT DOCUMENTS

| | | | |
|---|---|---|---|
| 2009/0005167 A1* | 1/2009 | Arrasvuori | ........... A63H 33/042 463/40 |
| 2013/0095726 A1* | 4/2013 | Sofman | .................. A63H 17/40 446/397 |

(Continued)

OTHER PUBLICATIONS

"Scalextric Quick Build reivew", [dated 2013]. [online], [retrieved Nov. 13, 2017]. Retrieved from the Internet <URL:http://www.telegraph.co.uk/motoring/caraccessories/10403302/Scalextric-Quick-Build-review.html>. 2 pages.*

(Continued)

*Primary Examiner* — Lawrence Galka
(74) *Attorney, Agent, or Firm* — Boyle Fredrickson, S.C.

(57) ABSTRACT

A vehicle toy that can work with common construction blocks provides connector surfaces covering the top and bottom of the toy housing for full integration into construction projects. Interface and control with the vehicle are provided by mesh wireless connectivity to a cell phone or the like greatly simplifying its construction. Mesh interconnections between vehicles and controllers allow greater interaction of the devices including allowing one device to be nominated as a referee permitting automatically refereed interactive contests.

3 Claims, 5 Drawing Sheets

(56) References Cited

U.S. PATENT DOCUMENTS

| | | | | |
|---|---|---|---|---|
| 2013/0190090 A1* | 7/2013 | Lin | ................. | A63H 17/006 |
| | | | | 463/36 |
| 2013/0217295 A1* | 8/2013 | Karunaratne | ........ | A63H 33/086 |
| | | | | 446/124 |
| 2015/0031268 A1* | 1/2015 | Waites | ................. | A63H 30/04 |
| | | | | 446/454 |
| 2016/0091895 A1* | 3/2016 | Hed | ................. | A63H 30/04 |
| | | | | 701/2 |
| 2016/0243455 A1* | 8/2016 | Nave | ................. | A63H 30/04 |

OTHER PUBLICATIONS

"C1301 Scalextric Demolition Derby "Quick Build"", [dated 2013]. [online], [retrieved Nov. 13, 2017]. Retrieved from the Internet <URL:https://www.youtube.com/watch?v=hizvXAx3UUQ>. 1 page.*

* cited by examiner

SMART PHONE CONTROLLABLE CONSTRUCTION BRICK VEHICLE

CROSS REFERENCE TO RELATED APPLICATION

This application claims the benefit of U.S. provisional 62/076,925 filed Nov. 7, 2014, and hereby incorporated in its entirety by reference.

BACKGROUND OF THE INVENTION

The present invention relates to a remote control vehicular toy and in particular to a toy platform that fully integrates with standard stud and tube type construction blocks and which may be controlled wirelessly by a smart phone, tablet or similar device.

Construction blocks such as those commercially available from Lego®, Mega Bloks® and others, provide for a stud and tube connection system that releasably holds the blocks together when attached upper face to lower face, for example, as described in U.S. Pat. No. 3,005,282 hereby incorporated by reference.

It is known to animate constructions assembled from such blocks, for example, by providing blocks incorporating motors, switches, or the like. Complex control of such animated constructions can be provided through the use of a computer controller also incorporated into a housing allowing it to be integrated with block constructions.

In this latter case, the controller is typically bulky and has a surface interrupted with manual buttons and visual displays that make it difficult to integrate into many designs and which can cause it to dominate any construction into which it is incorporated.

While playing with animated construction block assemblies can provide multiple dimensions for creative interaction, the creative options with current controller systems are limited, particularly with respect to interactions between other players. Fundamentally, it can be difficult to incorporate basic remote control devices into absorbing gameplay.

SUMMARY OF THE INVENTION

The present invention provides a vehicle element for popular construction block systems that eliminates control inputs and outputs on the vehicle element in favor of wireless communication with a smart phone or the like. As a result, a small form factor package may be created that better integrates with construction block constructions providing block-like upper and lower surfaces fully populated with studs or tubes.

The present invention facilitates interactive play with multiple vehicles by providing a mesh network that allows for the designation of a "referee" device overseeing automatic rules for playing games such as racing, tag or the like. In this use, the communication protocol used to provide the mesh network may also provide for proximity sensing between vehicles for more sophisticated interactive play.

Specifically then, in one embodiment, the invention provides a remote-control vehicle having a housing with an upper and lower surface each providing tube and stud-type mechanical interface elements for standard construction blocks. At least one electric motor is positioned within the housing and provides an axle extending from the housing to a wheel. The housing holds an electronic circuit including a computer processor and a radio transceiver for establishing communication with remote wireless control devices for control of the at least one electric motor using the remote wireless control device.

It is thus a feature of at least one embodiment of the invention to provide a motor controller for construction blocks that may be tightly integrated into block constructions.

The remote-control vehicle may include a second electric motor providing a second axle extending from the housing for driving a second wheel, the second electrical motor independently controlled by the electronic circuit.

It is thus a feature of at least one embodiment of the invention to provide a simple mechanism for steering the device by the selective control of the motors.

The upper and lower surfaces may be substantially parallel and may each provide only a single uninterrupted rectangular array of mechanical interface elements over substantially the entire upper and lower surfaces.

It is thus a feature of at least one embodiment of the invention to provide an element that is substantially a large construction brick to permit full and versatile incorporation into a construction block construction.

The axle may extend from the housing parallel to the upper and lower surfaces on a side surface so that the wheel extends beyond planes defined by the upper and lower surfaces.

It is thus a feature of at least one embodiment of the invention to provide a vehicle that can operate in either of two orientations of right side up or upside down.

The radio transceiver may operate to provide communication with at least two remote control devices including a referee device and a control device and the computer may execute a stored program to receive commands from both the referee device and the control device for control of the electric motor and to provide priority to commands from the referee device when there is a conflict between commands from the referee device in the control device.

It is thus a feature of at least one embodiment of the invention to permit competitive gameplay between multiple vehicles moderated by an automated referee according to defined game rules.

The radio transceiver may operate to provide signals to the remote wireless control device and referee control device indicating a proximity of the radio transceiver to radio transceivers of other remote control vehicles.

It is thus a feature of at least one embodiment of the invention to make use of the wireless communication protocol for determining proximity of the vehicles to each other that is useful for many game formats.

The remote-control vehicle may further include at least one sensor communicating with the computer processor for providing a signal to the wireless control device and referee control device.

It is thus a feature of at least one embodiment of the invention to permit sensors to be provided allowing remote conditions to be reported from the vehicles to the referee device and control device with respect to control of gameplay.

The sensor may be a bumper positioned on a side wall between the upper and lower surfaces for detecting a contact between the bumper and another surface to provide a signal to the remote wireless control device and the wireless referee device.

It is thus a feature of at least one embodiment of the invention to permit control of contact between the vehicle and a stationary or moving structure as part of gameplay.

More generally, the invention ma provide a game system having multiple smart phone-type devices, for example, including a first wireless device including an interconnected wireless transceiver, electronic processor, and player interface for receiving commands from a player and a second wireless device, including an interconnected wireless transceiver, electronic processor, and player interface for receiving commands from a player. The system may include two remote control vehicles as described above and a program executing in portions on the wireless control device, the wireless referee device and the at least two remote-control vehicles to: (a) receive commands at each of the remote-control vehicles from a corresponding first and second wireless device operating as a control device allowing the player to input commands to the player interface to control the corresponding remote-control vehicle; (b) provide sense condition signals from each remote-control vehicle to one of the first and second wireless devices operating as a referee device; and (c) receive commands from the referee device to control at least one of the remote-control vehicles according to the sensed condition signals and a rule set defining game rules of the game conducted with the first and second wireless devices.

It is thus a feature of at least one embodiment of the invention to make use of multiway wireless interconnectivity to provide for automatic refereeing of a variety of games using the extensive processing power of the wireless smart phone-type devices and their ability to download applications that may define gameplay.

In one example, the sensed signal may indicate an out-of-bounds vehicle position and the program may execute so that a command from the referee device causes a pause in operation of the remote-control vehicle providing the out-of-bounds signal for a predetermined period of time.

It is thus a feature of at least one embodiment of the invention to provide more sophisticated results from violation of game rules related to boundaries, for example, better simulating the results of a crash or the like.

In another example, the sensed signal may provide an indication of proximity between the first and second remote-control vehicles and wherein the program executes to provides for an "it" token transfer between one remote-control vehicle currently having the "it" token and another remote-control vehicle not currently having the "it" and to output a relative score to the first and second remote-control vehicles associated with that transfer.

It is thus a feature of at least one embodiment of the invention to permit an automatically moderated and scored tag game.

These particular objects and advantages may apply to only some embodiments falling within the claims and thus do not define the scope of the invention.

DETAILED DESCRIPTION OF THE PREFERRED EMBODIMENT

Construction Block Vehicle System

Figure 1:
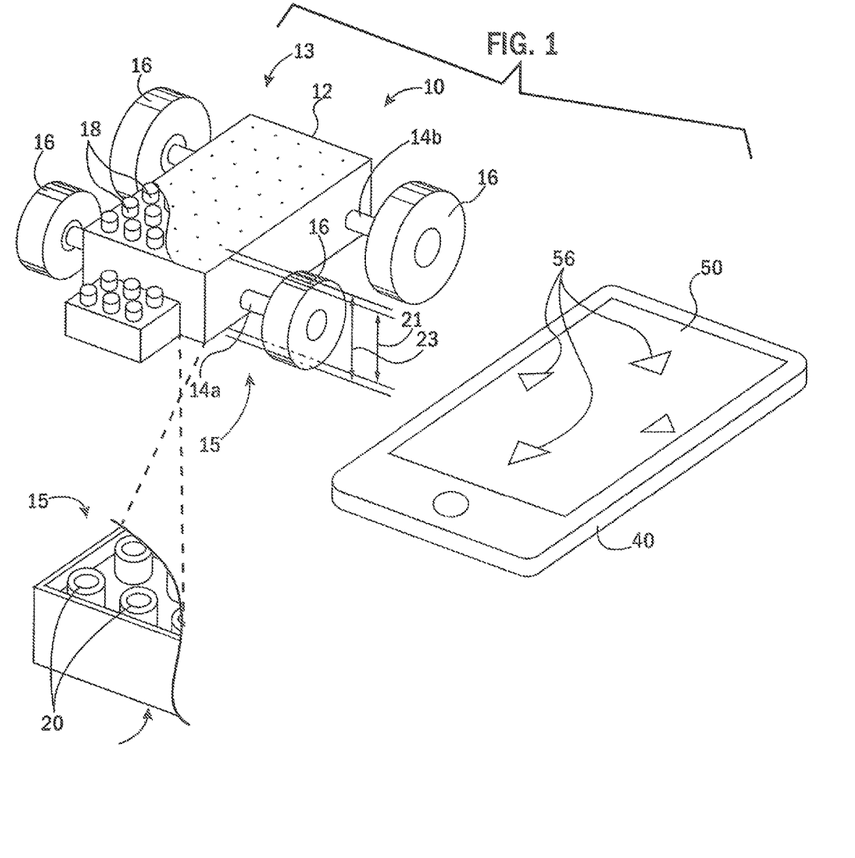
FIG. 1 is a perspective view of the vehicle platform of the present invention next to a smart phone that may be used as a controller for the vehicle.

Referring now to FIG. 1, a vehicle 10 may provide for a generally rectangular block (parallelepiped) shaped housing 12 having front and rear parallel axles 14a and 14b extending from inside the housing 12 outward therefrom. Each distal end of the axles 14 may terminate at a rubber wheel 16, the wheels 16 arrayed to simultaneously contact a planar surface beneath the housing 12 to propel the vehicle 10 along that surface.

An upper surface 13 of the housing 12 may provide for construction block studs 18, for example, over substantially the entire upper surface 13 as a single uninterrupted rectangular array of equal columns and rows of studs 18. The studs 18 may be integrally molded to the housing 12 as an injection molded part. Each of the studs 18 of this uninterrupted rectangular array is regularly spaced along vertices of a square grid that allow connection to other similar dimension construction block such as Mega Bloks manufactured by MEGA Brands Inc. or LEGOS® manufactured by the LEGO Group and described in U.S. Pat. No. 3,005,282 hereby incorporated by reference. Generally the upper surfaces of the studs 18 will lie in a common plane.

A lower surface 15 of the housing 12 may provide for corresponding construction block tubes 20, for example, over substantially the entire lower surface 15 as a single uninterrupted rectangular array of equal size columns and rows of tubes 20. Again the tubes 20 may be integrally molded to the housing 12 as an injection molded part and may be spaced along vertices of a square grid that allow connection to other similar dimension construction block elements as described above.

The upper surface 13 and lower surface 15 will be generally parallel and separated by a distance 21 that is smaller than a diameter 23 of the smallest of the wheels 16 so that the wheels 16 may extend at once both above a plane of the upper surface 13 and below a plane of the lower surface 15. For this purpose the axles 14 may be positioned approximately midway between the upper surface 13 and lower surface 15. These relative dimensions allow the housing 12 to roll on the wheels 16 with either the upper surface 13 above the axles 14 or below the axles 14 with the vehicle 10 inverted.

Figure 2:
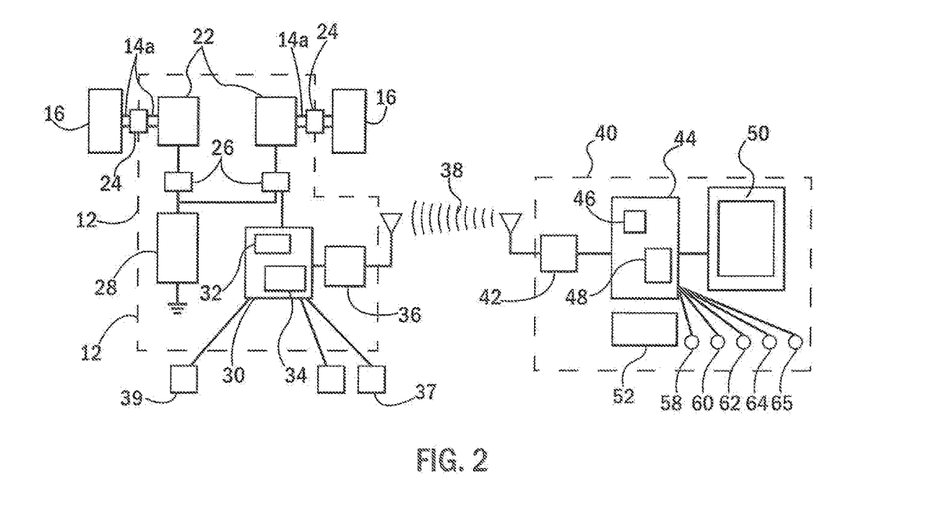
FIG. 2 is a block diagram of the vehicle platform and smart phone showing the principal functional elements of each.

Referring now also to FIG. 2, axles 14a may be independent so that each attaches independently to a different electric motor 22, for example, a DC permanent magnet motor. Electric motors 22 may communicate through a planetary, gear-down gearbox 24 with the respective wheel 16. The electric motors 22 may be controlled by solid-state switches 26, such as transistors, metering power from a battery 28 contained in the housing 12 to the electric motors 22.

Each of the solid-state switches 26 may be controlled independently by a microcontroller 30 having a processor 32 and electronic memory 34 holding a stored program. The microcontroller 30 may also receive power from the battery 28. In addition, power from the battery 28 may be provided to a low energy Bluetooth (BLE), also known as Bluetooth Smart, transceiver 36 that may communicate with the microcontroller 30. The transceiver 36 may receive commands via Bluetooth signals and transmit the signals to the microcontroller 30 which uses its stored program to control the motors 22 independently. This independent control may provide for simultaneous forward rotation of each motor 22, simultaneous reverse rotation of each motor 22 or single reverse or forward rotation of only one of the two motors 22. These control states allow the vehicle 10 to move forward or backwards in a straight line or curve so as to turn left or right. It will be appreciated that different motor speeds may also be implemented by controlling the voltage or current received by the motors 22, for example, by providing suitable control signals to the solid-state switches 26, for example, a current signal, or to a bipolar transistor which may then act as a current source.

Microcontroller 30 may also communicate with one or more sensors 37 such as light sensors or push button switches or the like and one or more output devices 39 such as an LED or piezoelectric transducer that can be incorporated into the housing 12 without interfering with the block connector surfaces. The transceiver 36 may receive these sensor values from the microcontroller 30 and transmit those as Bluetooth signals.

The Bluetooth transceiver 36 may transmit and receive Bluetooth signals 38 to or from a smart wireless controller 40 such as a smart phone or tablet or the like containing a Bluetooth transceiver 42. This Bluetooth transceiver 42 may communicate with an internal processor system 44 incorporating a processor 46 and electronic memory 48 holding a stored program. Typically, the processor system 11 will also communicate with a touchscreen 50 providing for graphic display output as well as a touch sensitive surface. In this way the touchscreen 50 provides a general-purpose human machine interface.

The wireless controller 40 will be powered by a battery system 52 so as to provide portability in the manner of an ideal remote control unit. Generally the smart wireless controller 40 may also include a variety of additional sensors including a camera 58, a three-axis accelerometer and/or gyro 60, a microphone 62, a compass 64, and a GPS receiver 65.

The program in the memory 48 of the smart wireless controller 40 may execute to provide on the touchscreen 50 a set of direction arrows 56 that may be touched to control the operation of the motors 22 either in tandem forward, tandem reverse, or one forward at a time as described above. Alternatively or in addition to this control mechanism, the smart wireless controller 40 may sense tipping, shaking, or rotation of the smart wireless controller 40 using the internal accelerometer or gyroscope 60, or the compass may be used to effect control of the vehicle 10, and these inputs may be used to control the operation of the motors 22.

It will be appreciated that the hardware and processing power of the smart wireless controller 40 allows for extremely sophisticated control strategies including, for example, controlling sequences of moves of the vehicle 10 according to a program, for example, prepared in the manner of the Logo computer program which allows children and adults to learn basic programming skills using movement of the vehicle 10. It will also be appreciated that the camera 58, for example, may be used to track the location of the vehicle 10 and to provide control signals to the vehicle 10 based on camera observation based on that tracking, for example, to move the vehicle 10 automatically through a maze or the like under automated visual feedback.

Equally important, the additional processing capability of the smart wireless controller 40 allows, for example, the smart wireless controller 40 to control multiple vehicles at the same time, for example, using commands from players entered into four different quadrants of the touch display. In this way interference among multiple controllers is eliminated, the need for multiple controllers is eliminated and the single communication channel may be used, significantly reducing costs. Each different vehicle 10 may be given a unique identification code, for example, like a MAC address so as to sort out the commands intended for that particular vehicle 10.

The ability of the vehicle 10 to work with standard construction blocks allows not only classic vehicles to be constructed on top of the vehicle 10 but also, for example, permits robots or similar fighting engines to be constructed which may be collided against each other in the manner of battling robots or may play in competitive activities, for example, as soccer players. In this case, the height of the structures added to the housing 12 using construction bricks may be substantial and many levels high, for example, exceeding 10 to 20 construction blocks. In addition, other motorized elements such as rotating arms or the like may be added.

Figure 3:
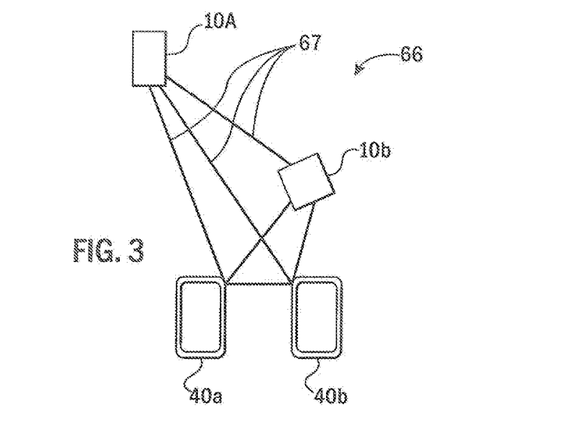
FIG. 3 is a diagram of a mesh network implemented by the present invention allowing communication among multiple controllers and vehicles.

Referring now to FIG. 3, the present invention can provide a multiperson play system 66 using multiple controllers 40, for example, controllers 40a and 40b and multiple vehicles 10a, 10b in a mesh network 67 in which each vehicle 10 is in bidirectional communication with each controller 40 and the controllers 40 are in bidirectional communication with each other and the vehicles 10 are in bidirectional communication with each other. In this mesh network 67, the various processors of the controllers 40 and vehicles 10 may jointly execute a program 70 (shown generally in FIG. 4).

Figure 4:
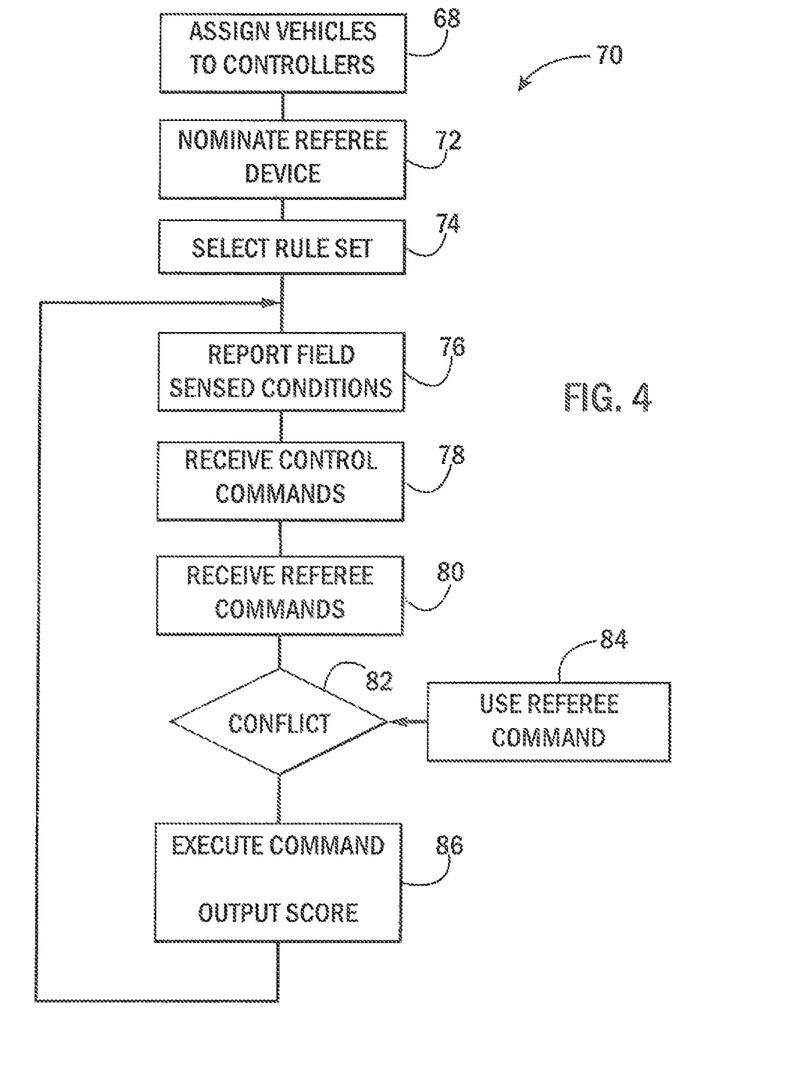
FIG. 4 is a flowchart of a program executed by the interconnected controllers and vehicles of FIG. 3.

Referring now to FIGS. 3 and 4, particular control assignment, for example, of controller 40a to control vehicle 10a and for controller 40b to control vehicle 10b may be enforced through the use of unique addresses for the different devices so that an individual player having a given controller 40 may control only vehicles 10 assigned to that controller 40. This linking of controllers 40 to vehicles 10 may be accomplished by a commissioning process per process block 68 in which all vehicles are identified, for example, on the touchscreen 50 of the controllers 40 and the player taps those images to make the necessary control assignments. At the conclusion of process block 68, each vehicle 10 will have a single unique controller 40 for the purpose of providing a control device receiving commands from the player.

Per succeeding process block 72, the players may then nominate one of the controllers 40 to provide a referee device. The nominated control controller 40 may provide for dual functionality in this capacity both as a controller device and as a referee device. Alternatively a separate controller 40 may be used for the referee device. Generally the referee device will enforce game rules in the manner of a referee and will keep score and provide outputs of the score as appropriate for that game. The particular rules of a desired game may be implemented in the form of an application program downloaded, for example, from the Internet onto the controller 40 providing the referee device.

As indicated by process block 74, after a referee device is selected, the particular rule set may be selected from a variety of different applications listed on the controller 40 providing for the referee device functionality. The rule set will provide for different rule functions having arguments based on signals received from the players of the controllers 40 and signals sensed by the vehicles 10 together with additional data such as from timers and the like, and having arguments in the form of commands sent to the vehicles 10 as will be apparent from the following examples.

The program 70 may then allow for operation of the vehicles 10 by the controllers 40 operating as control devices through repetition of a series of process blocks 76 and 78. At process block 78, the vehicles 10 report sensed activity in the vicinity of the vehicles 10 to their associated controller 40 and to the referee device, in the simplest case, the sensed activity will be a proximity of a vehicle 10 to other vehicles 10 or objects being part of the mesh network 67. Here, proximity to another device having a Bluetooth transceiver may be readily determined as a feature of Bluetooth communication. In other cases, various sensors 37 may provide the signals communicated from the vehicles 10.

At process block 78, vehicles 10 may receive commands from the controllers 40 acting as control, devices from inputs on the controllers 40 by the players. These commands provide direct control of the vehicles 10, for example, steering them and directing them forward and backward at different speeds. These commands may also execute pre-stored sequences of commands to the same effect.

At process block 80, the vehicles 10 may also receive commands from the referee device. At decision block 82, these commands from the referee device are compared to commands from the control devices to determine if these different commands conflict based on the rule set. If so, at process block 84, referee device commands override or modify those of the control device (either or both as implemented by a controller 40).

At process block 86 the prevailing instructions are executed and outputs may be provided, for example, indicating scoring or game progress.

Example I

Figures 5, 6, 7:
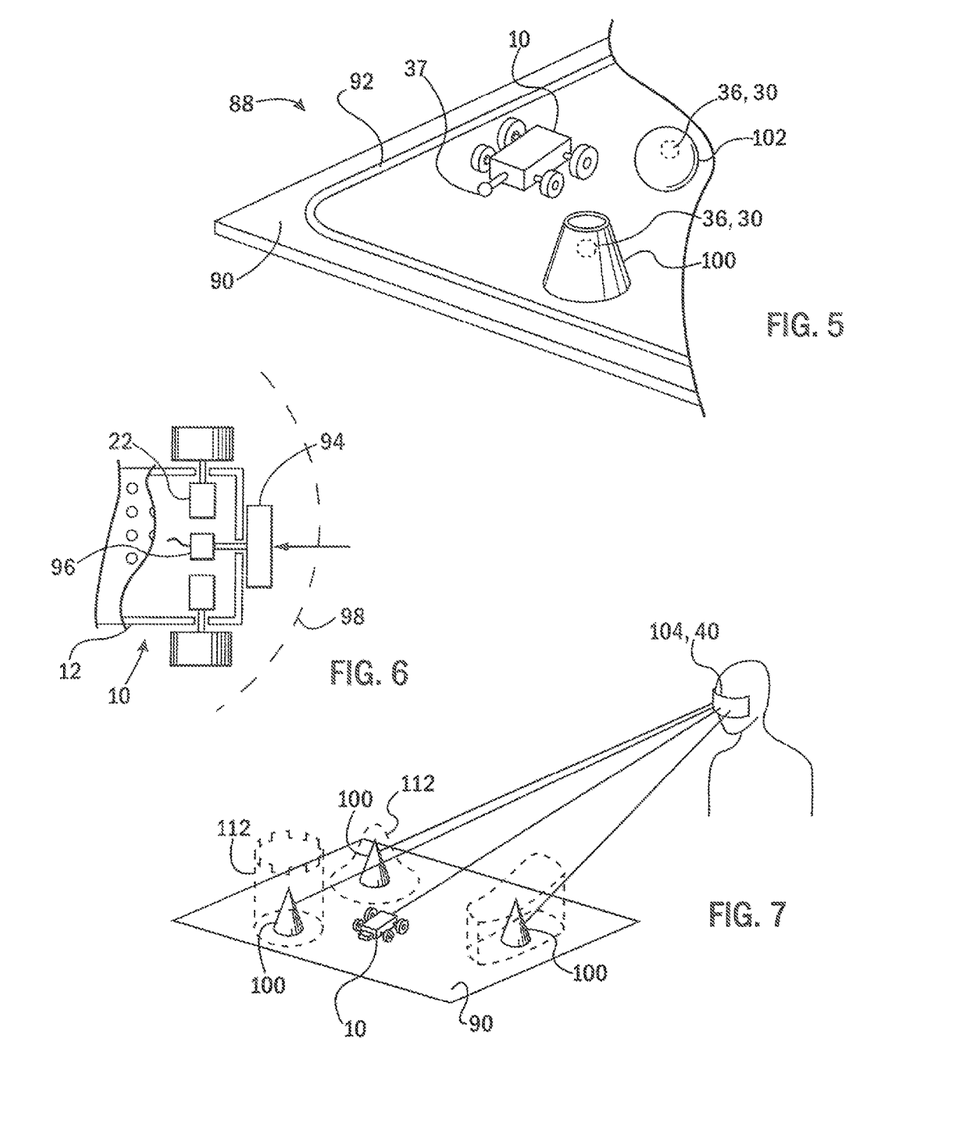
FIG. 5 is a fragmentary view of manipulables that may be placed in the environment of the vehicles for added gameplay features.
FIG. 6 is a fragmentary block diagram of a bumper activating a switch for signaling contact between the vehicle and a stationary surface.
FIG. 7 is a simplified perspective view of the manipulable serving as fiducials for virtual reality augmentation.

Referring also to FIG. 5, in one example, the system may implement an obstacle course or racecar-type game in which multiple vehicles 10 race or maneuver over an area 88. In one embodiment the area may be to delineated by a mat 90 having optical or other indicia 92 printed on its upper surface such as may be sensed by a sensor 37 of the vehicle 10 for example, an LED photosensor array). The indicia 92 may, for example, provide for a boundary of a playing field that must not be exited or edges of a racecourse track that must not be passed through during racing. In this game, a signal sent from the vehicles 10 indicating a crossing of that boundary may be received by the referee device which may then provide a command to the vehicle 10 crossing the boundary to stop for a given period of time, for example, 5 seconds, providing an implicit penalty for crossing the boundary. This command from the referee device overrides any commands from the player per decision block 82 of FIG. 4 that might otherwise instruct the vehicle 10 to continue moving.

Alternatively, the indicia 92 may indicate, for example, waypoints or goals that the vehicles 10 must "touch" by sensing the indicia 92 with the sensor 37. Here the referee device may provide for a score for how many goals were attained by each vehicle 10 and/or may measure a time required to reach each goal. Goals indicated by the indicia 92 may also represent the finish line of a racecourse and the time may provide an indication of the winner of the race, for example, as displayed on one of the controllers 40. It will be appreciated that the referee device may also provide for a starting "gun" or signal for the beginning of the race. In this regard, the referee device may monitor whether driving commands are sent by the players to the vehicles before the clock indicates that the race should start, and may penalize those players appropriately, for example, with respect to points, time, or by pausing motion of the vehicle 10.

Example II

Referring no to FIG. 6, each vehicle 10 may provide a bumper 94 positioned, for example, at a front edge of the housing 12 connected to a switch 96 or the like communicating with the microcontroller 30 (shown in FIG. 2) to indicate contact between the bumper 94 and some external structure. Alternatively, a virtual bumper may be created by establishing a boundary 98 related to Bluetooth proximity. These features allow a game rule set related to a game of tag to be implemented in which a given vehicle 10 is randomly assigned an it token (being a virtual token implemented in the program rather than a physical token). This token may then be passed to another vehicle 10 by maneuvering vehicle 10 with the token to touch its bumper 94 to another vehicle or to be within the virtual boundary 98 of another vehicle 10. Once this point of proximity is attained, the token is transferred to the other vehicle 10 by the referee device monitoring these proximity signals and keeping an accounting of the location of the token. Passing of the token may be signaled, for example, by a tone or visual display on the referee controller 40 which may also keep track of statistics such as the time the token is held and may enforce rules such as "no touch backs" which prevent the token from being returned to the individual most recently releasing the token. A visual indication may be provided on one of the vehicles 10 that it has the token, for example, by illuminating an LED. It will be appreciated that this sensed contact feature may also be implemented without the referee device either by programming in the vehicle 10 or in its corresponding control device controller 40.

Referring again to FIG. 5, other manipulable elements beyond the mat 90 or instead of the mat 90 may be provided in the region through which the vehicles 10 move including, for example, pylons 100, for example, for implementing a slalom type race, or a ball or puck 102, for example, such as may be used for playing a soccer or hockey type game. These manipulables 100 and 102 may include radio transmitters for being part of the mesh network 67 of FIG. 3, for example, to receive commands causing the illumination of internal lights or the like and provide proximity signals. The manipulables 100, 102 may alternatively have other proximity sensing elements in them for detection of the location of the vehicles 10 and communication of this location to the controllers 40.

Referring to FIG. 7, the pylons 100 may provide for a unique visual appearance or other identifying feature, for example, synchronized light beam signals allowing them to be uniquely identified by a camera in a virtual reality headset 104 implementing the controller 40. In this case, the pylons 100 may also serve as fiducials for anchoring virtual elements 112 created visually by the virtual reality headset 104 positioned with respect to the pylons 100 providing, for example, a fanciful landscape through which the vehicles 10 may move, in this case, collisions between the vehicles 10 and the virtual elements 112 may be prevented by proximity sensing between the pylons 100 and the vehicles 10, and the signal sent from the vehicles 10 to the referee device which turns off the vehicles 10 when they collide with the perimeter of the virtual element 112 allowing only operation of the vehicle 10 backwards away from the virtual element 112.

It will be appreciated that the vehicles 10 may make use of control "macros" programmed into or executed on the controllers 40, for example, executing a set of prestored moves or the like. Because a single controller 40 may control and communicate with multiple vehicles 10, it is possible to provide all of the vehicles 10 the same commands allowing them to move in a synchronized fashion.

Retrievable Golf Ball

Figure 8:
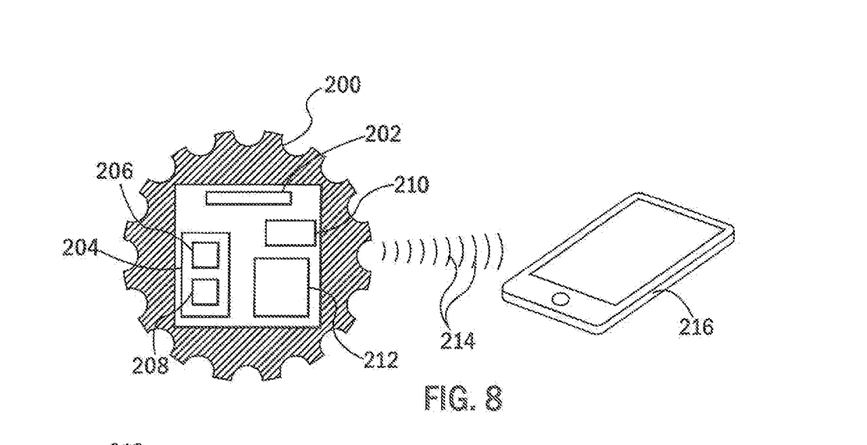
FIG. 8 is a figure of a design for a golf ball or other retrievable item employing a Bluetooth transceiver establishing a connection to a smart phone or similar device for location purposes.

Referring now to FIG. 8, a golf ball 200, or any device whose location, height, speed, or trajectory may need to be determined, may be constructed to include a battery 202 providing power to a processor system 204 having a processor 206 and memory 208 holding a stored program. The processor system 204 may communicate with an accelerometer/gyro 210 and may further communicate with a low-energy Bluetooth transceiver 212 also powered by the battery 202. The processor system 204 may operate in a low-power mode until high accelerations trigger a wake state in which the golf ball 200 transmits a Bluetooth signal 214 to a smart wireless device 216 of the type described above with respect to smart wireless controller 40.

Figure 9:
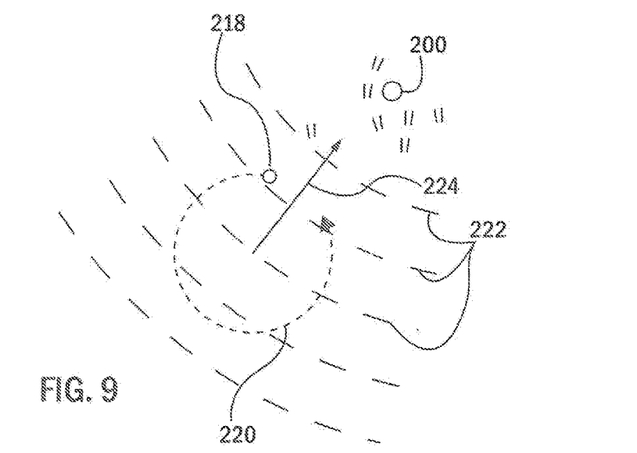
FIG. 9 is a simplified plan view of a process of determining a bearing of the golf ball of FIG. 8 using a smart phone.

Referring now to FIG. 9, location of the golf ball 200 may be obtained by a direction finding process in which a player 218 walks along a circular path 220 moving through isostrength lines 222 related to the strength of the signal from the golf ball's 200 internal Bluetooth transceiver 212. Alternatively, the player may rotate in place using the player's body as a signal absorber that periodically occludes the signal from the golf ball. Through use of the compass or an internal OPS and the measurement of signal strength along the path 220 or with rotation, a direction 224 of maximum signal strength may be determined which, when coupled with the position of the player, will indicate a direction between the player and the golf ball 200.

Figure 10:
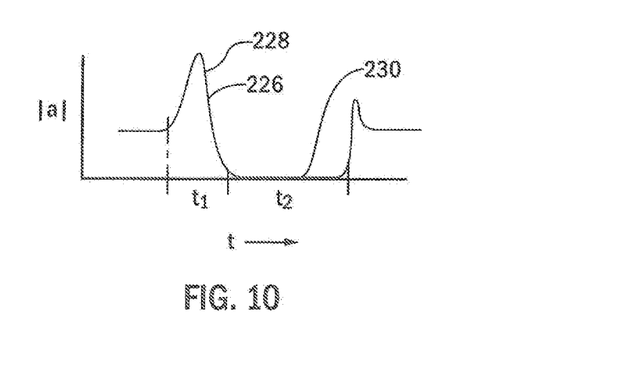
FIG. 10 is a plot of acceleration versus time from an internal accelerometer in the golf ball of FIG. 8 that may be used to determine approximate range and make other flight measurements.

Referring also to FIG. 10, measurements 226 of acceleration as a function of time may be made by the golf ball 200 using the contained accelerometer/gyro 210 and transmitted to the smart wireless device 216 to provide additional information about the range of the golf ball 200. A peak acceleration 128 may be identified at the time the golf ball 200 is struck with the golf club and integration of this peak over time $t_1$ may provide a force that may be used to calculate an approximate acceleration of the golf ball. After the golf ball 200 leaves the club, a period of zero acceleration 130 will be experienced as the golf ball 200 moves in free flight through the air during a period of time $t_2$. This time of zero acceleration defines the limit of time $t_1$ which begins as soon as acceleration rises above the normal gravitational constant value.

With acceleration and flight time, a rough range may be determined assuming normal golf ball angle of flight. This estimate may be refined through knowledge of the type of club being used to strike the golf ball 200. When the golf ball is ultimately recovered, an actual distance to the golf ball 200 (measured with GPS as the player walks to the golf ball 200) can be determined and the time of flight and maximum acceleration may be used to determine qualities of the golf swing including, for example, the loft, angle and the like.

It will be appreciated that other radio communication protocols than Bluetooth LE may be used in these applications.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A game system comprising:
a first device including an interconnected wireless transceiver, electronic processor, and player interface for receiving commands from a player;
a second device including an interconnected wireless transceiver, electronic processor, and player interface for receiving commands from a player;
at least two remote-control vehicles each having a housing having an upper and lower surface each providing tube and stud-type mechanical interface elements for standard construction blocks; at least one electric motor positioned within the housing and providing an axle extending from the housing to a wheel and an electronic circuit including a computer processor and a radio transceiver for establishing mesh communication with at least two other devices; and
a program executing in portions on the wireless control device and the two remote-control vehicles to;
(a) receive commands at each of the remote-control vehicles from a corresponding first and second wireless device operating as a control device allowing the player to input commands to the player interface to control the corresponding remote-control vehicle;
(b) provide sense condition signals from each remote-control vehicle to one of the first and second wireless devices operating as a referee device; and
(c) control at least one of the remote control vehicles according to the sensed condition signal;
wherein the program further executes to implement in the controllers at least one referee device receiving the sensed condition signals and to:
(c) receive commands at the remote control vehicles from the referee device to control at least one of the remote control vehicles according to the sensed condition signals and a rule set defining game rules of a game conducted with the first and second wireless device;
wherein the sensed signal indicates an out-of-bounds vehicle position and wherein the program executes so that a command from the referee device causes a pause in operation of the remote-control vehicle providing the out-of-bounds signal for a predetermined period of time;
wherein the sensed signal provides an indication of proximity between the first and second remote-control vehicles and wherein the program executes to provides for an "it" token transfer between one remote-control vehicle currently having the "it" token and another remote-control vehicle not currently having the "it" token and to output a relative score to the first and second remote-control vehicles associated with that transfer.

2. The game system of claim 1 wherein the proximity is sensed by at least one of a strength of the radio signals exchanged between the first and second remote-control vehicles and contact between the first and second remote-control vehicles.

3. The game system of claim 1 wherein the sensed condition is a proximity between the first and second remote-control vehicles and the program responds to the sensed condition to stop operation of at least one of the first and second remote-control vehicles for a predetermined period of time.

* * * * *